United States Patent

[11] 3,540,610

| [72] | Inventor | Andrew A. Pontani |
| | | 14728 Lassen St., Sepulveda, California 91343 |
| [21] | Appl. No. | 796,007 |
| [22] | Filed | Feb. 3, 1969 |
| [45] | Patented | Nov. 17, 1970 |

[54] BOAT TRAILER
16 Claims, 9 Drawing Figs.

[52] U.S. Cl. ..................................... 214/390,
214/396; 280/491, 280/493
[51] Int. Cl. ...................................... B60p 3/10
[50] Field of Search ........................................ 214/390-
—396, 505, 506; 280/414, Boat Tr. Digest

[56] References Cited
UNITED STATES PATENTS

| 2,494,509 | 1/1950 | Gruska | 214/394 |
| 2,536,563 | 1/1951 | Montgomery | 214/396 |

*Primary Examiner*—Albert J. Makay
*Attorney*—Dennison and Dennison

ABSTRACT: A boat trailer having a rear cradle frame and front peripheral U-frame rigid therewith which serves as a walkway. A nesting bar conforming to the bow shape of the boat is mounted within the U-frame and is pivotally mounted for vertical swinging movement with respect thereto. Releasable latch means secure the boat to the nesting bar and an extendible hitch arrangement couples the trailer to a prime mover.

Patented Nov. 17, 1970
3,540,610
Sheet 1 of 2
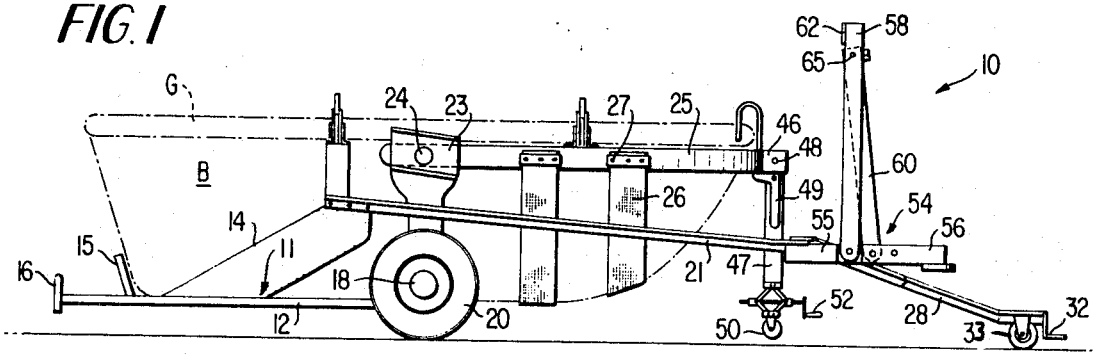
FIG. 1
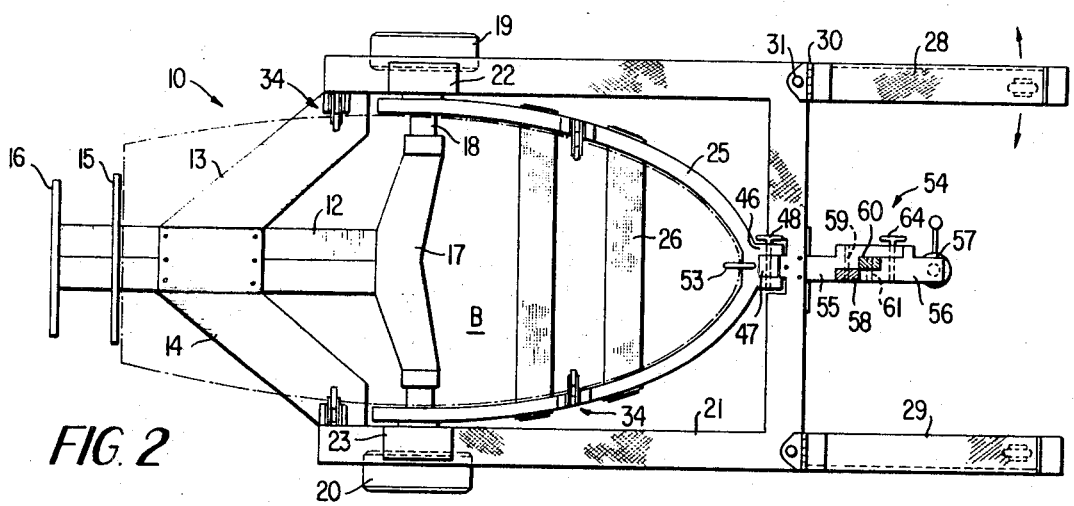
FIG. 2
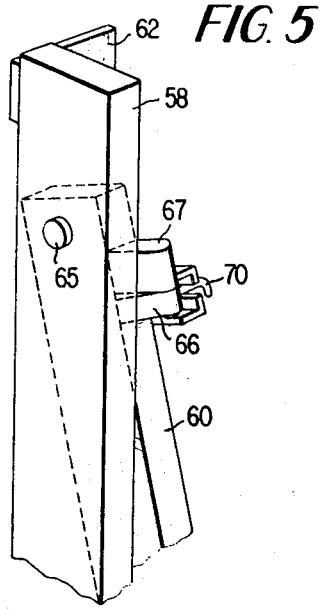
FIG. 5
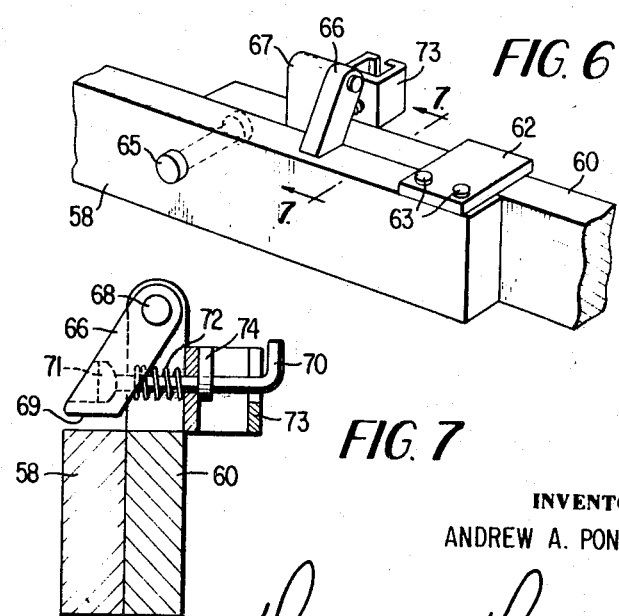
FIG. 6
FIG. 7
INVENTOR
ANDREW A. PONTANI
BY *Dennison & Dennison*
ATTORNEYS Patented Nov. 17, 1970
3,540,610
Sheet 2 of 2
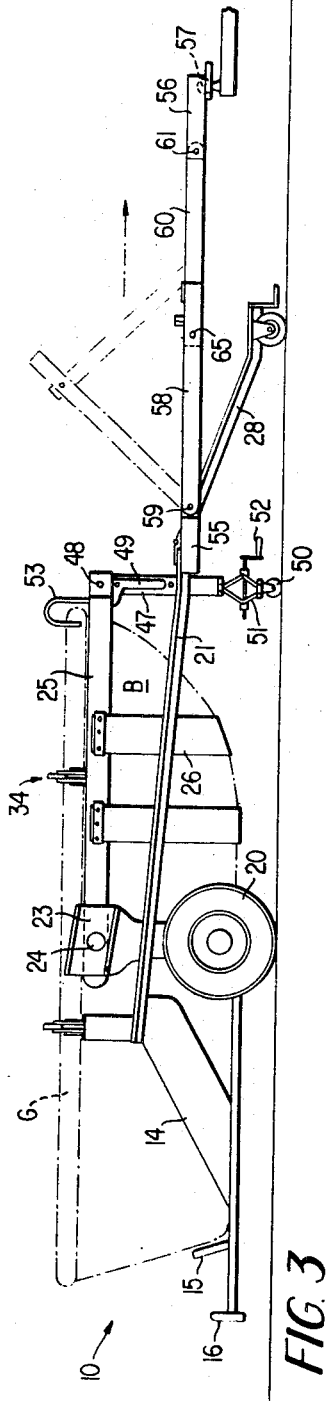
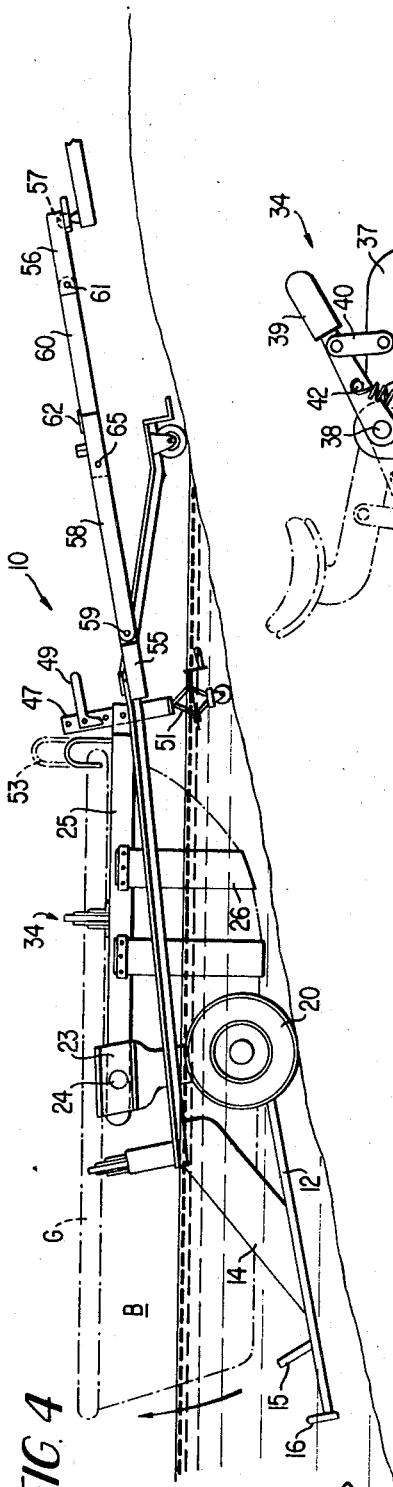
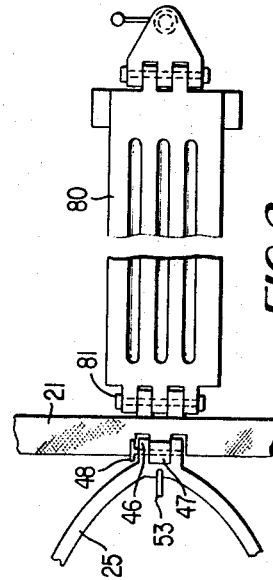
INVENTOR
ANDREW A. PONTANI
BY
ATTORNEYS

BOAT TRAILER

This invention relates primarily to new and useful improvements in boat trailers and in particular to a boat trailer construction which will handle large boats and is adapted for launching and recovering such boats from shore line areas not generally considered favorable for such operations.

Today many water sport enthusiasts transport their boats by means of a trailer secured to an automobile or other prime mover. With the larger sizes of boats of over seventeen feet in length difficulties in handling both the boat and the trailer during launching and recovery are common. In addition, the number of public launching ramps available are usually insufficient to accommodate the increasing number of boat owners. As a result such owners have turned to commercial loading facilities or else sacrifice the portability and ground transportability of their boats by renting slips at a boat house or dock.

In launching larger boats especially with adverse shore line conditions it is often difficult to back the tow vehicle to the water's edge and it is therefore frequently necessary to unhitch the trailer from the vehicle and manually roll the same into the water. The present invention overcomes these difficulties in this art.

Accordingly, it is an object of this invention to provide an improved trailer for boats incorporating a pivoting nesting bar frame for facilitating launching and recovering of the boat.

A further object of the invention is to provide a boat trailer construction including side ramps, platforms, and steps which also serves as a loading dock.

Another object of this invention is to provide a boat trailer having an extendible hitch connection to facilitate backing of the trailer into the water.

Another object of the present invention is to provide a boat trailer especially suitable for large boats which is of sturdy construction, has a low center of gravity, and is capable of supporting boats of various weights and sizes.

A yet further object of the instant invention is to provide a boat trailer having improved adjustable front end support means to facilitate movement on a slope into and from the water.

A further object of this invention is to provide a new boat trailer assembly which is economical to manufacture, safe and efficient in use, and relatively compact for storage.

For still further objects and for a better understanding of the invention, reference may be had to the following detailed description taken in conjunction with the accompanying drawings which illustrate the best mode now contemplated of carrying out the invention and in which;

FIG. 1 is a side elevation of a boat trailer made in accordance with the present invention;

FIG. 2 is a plan view of the trailer shown in FIG. 1 with a boat indicated by the dotted lines;

FIG. 3 is a side elevation similar to FIG. 1, but showing the extendible hitch in its fully extended position;

FIG. 4 is a side elevation showing the trailer in position in the water with the boat partially secured thereto;

FIG. 5 is a fragmentary perspective of a portion of the extendible hitch;

FIG. 6 is a fragmentary perspective of the hitch portion of FIG. 5 showing the same in locked position;

FIG. 7 is a sectional view taken along lines 7-7 of FIG. 6;

FIG. 8 is a plan view of a modified form of hitch assembly; and

FIG. 9 is an end elevation of a holddown clamp used with the trailer.

Reference is now made specifically to the drawings, wherein like reference numerals designate similar parts throughout the several views and wherein the boat trailer constituting the subject matter of this invention is designated generally at 10.

The trailer includes a rear cradle assembly 11 comprising a longitudinal frame member or backbone 12 to which are attached as by welding or by bolting cradle side members 13 and 14 which extend forwardly and upwardly as best seen in FIGS. 1 and 2. An upstanding rear ledge 15 is secured to the longitudinal frame member 12 and serves as a rear limit rest for the boat B. Secured further rearwardly along the longitudinal frame member is a bumper 16 which merely serves to protect the trailer and the boat against possible damage from other vehicles or obstructions which the trailer may inadvertently back into. The forward end of longitudinal frame member 12 is secured to a cradle cross frame 17 forming therewith a generally T-shaped backbone structure as best seen in FIG. 2. Axle stub shafts 18 extend outwardly from each of the extremities of the cradle cross frame and journal wheels 19 and 20 with suitable bearings as is well known in the art. Due to the geometry and dimensions chosen, the center of gravity of the trailer construction when loaded will be below the axle line between the stub shafts 18 providing better stability for over-the-road-hauling.

The forward ends of the cradle side members 13 and 14 are secured to a U-shaped outer frame 21 which extends about the entire front of the boat trailer assembly. This outer frame serves not only to protect the boat, but also as a walkway and the upper surface thereof may be provided with embossments or other treadway material to provide a firm and secure walking surface. This walkway will enable the user to more conveniently load and unload the trailer and also to perform necessary maintenance upon the boat without the necessity of the same being removed from the trailer. Extending upwardly and secured adjacent to each of the wheel assemblies are a pair of vertical supports 22 and 23 which serve as a mount for trunnions 24. Steps may extend outwardly from adjacent the top of the vertical supports as seen in FIG. 1 to further aid in entry into the boat. The trunnions 24 serve to pivotally secure a nesting frame 25 to the rear cradle assembly 11. Nesting frame 25 is specifically shaped to conform to the bow of the boat to be carried on the trailer and yet provide sufficient clearance for loading and unloading the boat without damaging the hull or superstructure. It will be apparent that the nesting frame 25 is capable of pivotal movement about the trunnions 24 as can be seen during entry into the water in FIG. 4. The forward portion of the boat is supported on the nesting bar by means of supporting belts 26 secured to the sides of the nesting bar by any conventional means such as the bolts 27. It will be understood that the belts 26 extend from one side of the nesting bar 25 beneath the boat and attach to the other side of the nesting bar. In order to facilitate boarding of the trailer and especially where the trailer is made in a large size to accommodate the larger sizes of boats boarding ramps 28 and 29 may be provided adjacent each of the front corners of the outer frame 21. The ramps may be hinged as by a conventional piano hinge 30 to a bracket which is secured by a pivot pin 31 to the outer frame. Additionally, a step 32 may be provided at the forward end where needed and the entire ramp may be supported as by a wheel 33 at the forward end. It will be apparent that when the terrain demands, the ramp may be pivoted about the pin 31 in the manner shown by the arrows in FIG. 2. In similar manner, one or more ramps may be folded back about the hinge 30 and, of course, both ramps will be folded backwardly and assume a position of rest against the longitudinal side portions of the outer frame 21 during movement of the trailer over land.

The boat is further secured to the trailer by means of holddown clamps 34 shown in greater detail in FIG. 9. The clamp is adapted to lock across the top of the gunnel G to prevent upward movement of the boat with respect to the nesting frame 25. The clamp includes vertical support plate 35 mounted by bolts 36 to the nesting frame. A holddown arm 37 is pivoted as by pin 38 to the support bracket and has an operating handle 39 at its outer extremity. A tie link 40 connects the operating lever to the holddown arm. The operating lever is normally biased by means of a tension spring 41 mounted between spring pins 42 and 43 on the operating lever and on the support bracket 35 respectively. The free end of holddown arm 37 is provided with a curved clamp surface within which is mounted a resilient pad 45. The construction described provides a toggle or snap-over linkage which tends to remain either locked or unlocked until an over center position of the operating handle 39 is reached. It is obvious that other forms of linkage may be applied to achieve the same results.

The nose portion of the nesting frame 25 is provided with a bifurcated portion 46 adapted to receive the vertically extending nesting bar post 47. The post 47 is provided with a series of lock holes into which a T bar pin 48 may be inserted to secure the nesting bar to the nesting bar post at a selected position of adjustment. A lock lever 49 is pivotally mounted on the post 47 and in one position as shown in FIGS. 1 and 3, prevents downward movement of the nesting bar even if the pin 48 is removed. The bar 49 may be pivoted in the manner shown in FIG. 4, however, to permit the nesting bar to move in respect to the post. The roller end of the nesting bar post is supported by a wheel 50 mounted upon a lazy tong adjustment 51 having an operating handle 52. This construction is known in the art and is especially used in automobile jacks and the like. By turning of the handle 52 which is attached to a screw shaft the arms of the lazy tongs may be extended or retracted to bring the wheel 50 into contact selectively with the surface. During travel over highways the wheel 50 will be retracted in the manner shown in FIG. 1, however, when the trailer hitch is extended in the manner shown in FIG. 3 and FIG. 4, the additional support of the wheel 50 is essential to proper and smooth operation of the trailer 52 dependent upon the particular configuration of the shore line.

A bow holding hook 53 may be provided reciprocable on the nose portion of the nesting frame 25. This hook may be manually moved upwardly to release position as shown in by the dotted lines in FIG. 4 when desired during launching of the boat.

The trailer assembly just described is secured to the vehicle by means of a hitch assembly shown generally at 54 which in one position as in FIG. 1 is retracted and locked for travel over the highways. When it is desired to move the trailer rearwardly into the water, the hitch assembly 54 may be extended as shown by the dotted lines in FIG. 3 thereby greatly increasing the distance between the towing vehicle and the trailer assembly. The hitch includes a trailer bracket 55 and a vehicle bracket 56. The trailer bracket may be secured to the outer frame 21 as by any conventional means such as bolts. The vehicle bracket may be attached directly to the tow vehicle by means of a conventional ball hitch 57. A trailer link 58 is pivotally secured to the trailer bracket 55 by a trailer link pin 59. In a similar fashion a vehicle link 60 is pivotally secured to the vehicle bracket 56 by means of a vehicle link pin 61. See FIG. 2. The trailer link 58 is provided adjacent its upper end with a stop plate 62 which serves to abut against the vehicle link 60 in the extended position as shown in FIG. 6. The stop plate is secured to the trailer link by screws or bolts 63.

In the retracted position of the link assembly the side forward extremity of the trailer bracket 55 extends beyond the vertically oriented links 58 and 60 and rests adjacent a portion of the vehicle bracket 56. Aligned holes are provided in each of the brackets to receive a lock pin 64 as shown in FIG. 2. It will be therefore seen that a secure pinned construction is provided to insure that the trailer hitch does not extend during severe towing loads. Links 58 and 60 are pivotally secured together adjacent their free ends by means of pivot pin 65 shown in FIGS. 5 and 6. A latching arrangement is provided to insure that the links will remain secure in their extended position as shown in FIG. 6. To this end a latch pawl 66 is pivotally mounted on a pawl support bracket 67 by means of pawl pivot pin 68. The support bracket 67 is attached to the vehicle link 60. The latch pawl 66 is provided at its free end with a lock face 69 adapted to limit upward movement of the trailer link 58. Means are provided to release the latch pawl 66 to permit movement of links 60 and 68 with respect to each other and to this extent a pawl release handle 70 having a bent end for manual engagement is attached to the latch pawl 66 by means of a curved head 71. A compression spring 72 serves to bias the pawl into the locking position. A latch bracket 73 is secured to the pawl support bracket 67 and has a slot in its free end to permit passage and turning of the pawl release handle 70. The side walls of the bracket 73 cooperate with a stop member 74 attached to the release handle to limit the movement of the handle and the pawl. It will be understood that in the retracted position of the links as shown in FIG. 5 the pawl 66 is retracted and the edge thereof is in contact with the side face of trailer link 58. Upon extension of the hitch the links 58 and 60 pivot with respect to each other about the pin 65 until such time as the link 58 clears the edge of the latch pawl 66 as shown in FIG. 6, when the stop plate 62 will abut against the top of the vehicle link 60. At this point the spring 72 will cause the latch pawl 66 to extend over the top surface of the trailer link securing the same against retraction. When it is desired to retract the hitch, the pawl release handle 70 will be withdrawn until the stop 74 is external of the bracket 73 and the pawl 66 is then in retracted position. At this time the pawl release handle may be rotated 90° locking the pawl in extended position if desired. The links are then free to pivot about the pin 65 to the initial position of FIG. 1 and FIG. 5.

With larger boats it may be desirous to provide a front ramp type hitch which is shown as a modification in FIG. 8. Here the hitch is not extensible and comprises a ramp member 80 which is secured between a conventional ball hitch mounting bracket and the front of the outer frame 21 as by means of a hinge or pivot pin 81.

OPERATION

In use the trailer is backed as close as possible to the shoreline in the retracted position of the hitch assembly with all pins and latches secured. The wheel 50 is extended into contact with the ground by means of the operating handle 52. At this point the lock pin 64 is removed and the vehicle is moved forwardly until the hitch is fully extended as shown in FIG. 3, wherein the latch pawl 67 springs into locking engagement with the link 58 and the stop plate 62 is in contact with the upper surface of the vehicle link 60. The rearward toggle clamps 34 may be released in the manner shown in FIG. 4 which will cause the rear of the boat B to pivot upwardly as the same floats in the water. At this point, if desired, the ramps 28 and 29 may be lowered for ease in climbing onto and from the trailer. As the boat is backed into the water the lock lever 49 may be pivoted to permit movement of the nesting frame 25 with respect to the nesting bar post 47. Of course, the pin 48 will be removed for this purpose. The nesting bar may be locked to the post with the pin to prevent the same from dropping as the toggle clamps are released. Here the forward portion of the boat is secured to the nesting bar by means of the bow holding hook 53. The hook may be withdrawn and the remaining clamps 34 released to permit the boat to float out into the water and free of the trailer. It will be apparent that the lock lever 49 serves with the pin 48 to secure the nesting bar to the trailer frame during travel. The loading of the boat onto the trailer is merely the reverse of the unloading procedure and once the forward end of the boat is secured on the supporting belts 26 and the clamps 34 are in place, the trailer may then be pulled outwardly from the water and as the boat leaves the water the rear portion will settle into the rear cradle 11. If desired, conventional winch means may be employed in conjunction with the trailer to initially pull the boat into a position centered on the nesting frame 25.

While I have shown and described a preferred form of the invention, it will be understood that various modifications and substitutions of equivalents will be obvious to those skilled in the art and such changes are deemed to be incorporated within the scope of the claims appended hereto.

I claim:
1. A boat trailer having a pair of wheel assemblies and a cradle frame secured thereto and extending rearwardly therefrom and adapted to receive the stern section of a boat, a nesting bar conforming in shape to the bow of the boat and extending forwardly from said wheel assemblies, means mounting said nesting bar to the wheel assemblies for vertical pivotal movement with respect thereto, releasable means for securing the bow of the boat to said nesting bar, and an outer frame rigidly secured to the cradle frame and extending about the bow and front sides of the boat outside of said nesting bar, and means locking said nesting bar from pivotal movement.

2. A boat trailer as defined in claim 1, and further including hitch means for connection to a prime mover, a said hitch means having a first retracted position and a second extended position.

3. A boat as defined in claim 2, and further including latch means for securing said hitch in said first retracted position during road transit.

4. A boat trailer as defined in claim 1 and further including a plurality of support straps attached to and suspended from opposite sides of said nesting bar and which serve to support the bow of said boat.

5. A boat trailer as defined in claim 1, wherein said releasable means for securing the bow of the boat to said nesting bar comprises a plurality of toggle action clamps mounted on said nesting bar and having a clamping surface engageable with the gunnel of said boat.

6. A boat trailer as defined in claim 5, said releasable means further including a hook on the nesting bar movable into locking position over the bow of the boat.

7. A boat trailer as defined in claim 1, wherein the center of gravity of the trailer with a boat secured thereto is below the axis of said wheel assemblies.

8. A boat trailer as defined in claim 1, wherein the outer frame has a flat upper surface and serves as a walkway.

9. A boat trailer as defined in claim 8 and further including at least one ramp hingedly mounted on the front of said outer frame and adapted to be folded back thereon during periods of nonuse.

10. A boat trailer as defined in claim 9, wherein said ramp is also pivotally mounted with respect to said outer frame so that it can be rotated into selected position about a vertical axis.

11. A boat trailer as defined in claim 10, and further including a ground engaging wheel beneath the free end of the ramp.

12. A boat trailer as defined in claim 1, wherein said means locking said nesting bar includes a vertical post secured to said outer frame and having a plurality of holes therein, and releasable pin means for locking said nesting bar to selected holes therein.

13. A boat trailer as defined in claim 12 and further including a support wheel assembly mounted on the lower end of said vertical post and as adjustable means for raising and lowering said support wheel assembly.

14. A boat trailer having a pair of wheel assemblies and a cradle frame secured thereto and extending rearwardly therefrom and adapted to receive the stern section of a boat, bow receiving means attached to said cradle frame, releasable means for securing the bow of the boat to said bow receiving means and an extendible hitch assembly for connecting said trailer to a prime mover, said hitch assembly including a pair of links, said first link being pivotally mounted at one end on said trailer, said second link being pivotally mounted at one end on a hitch means adapted to be secured to said prime mover said links being pivotally connected adjacent their free ends, pin means cooperating with said links and said trailer and hitch means to lock said links in an upright unextended position, and latch means to secure said links in the extended position of use.

15. A boat trailer as defined in claim 14, wherein said latch means includes a spring biased lock pawl mounted on one of said links and a stop plate mounted on the other of said links.

16. A boat trailer as defined in claim 15, and further including manual means to retract said lock pawl against said spring to permit retraction and folding of said hitch assembly.